Figure 1:
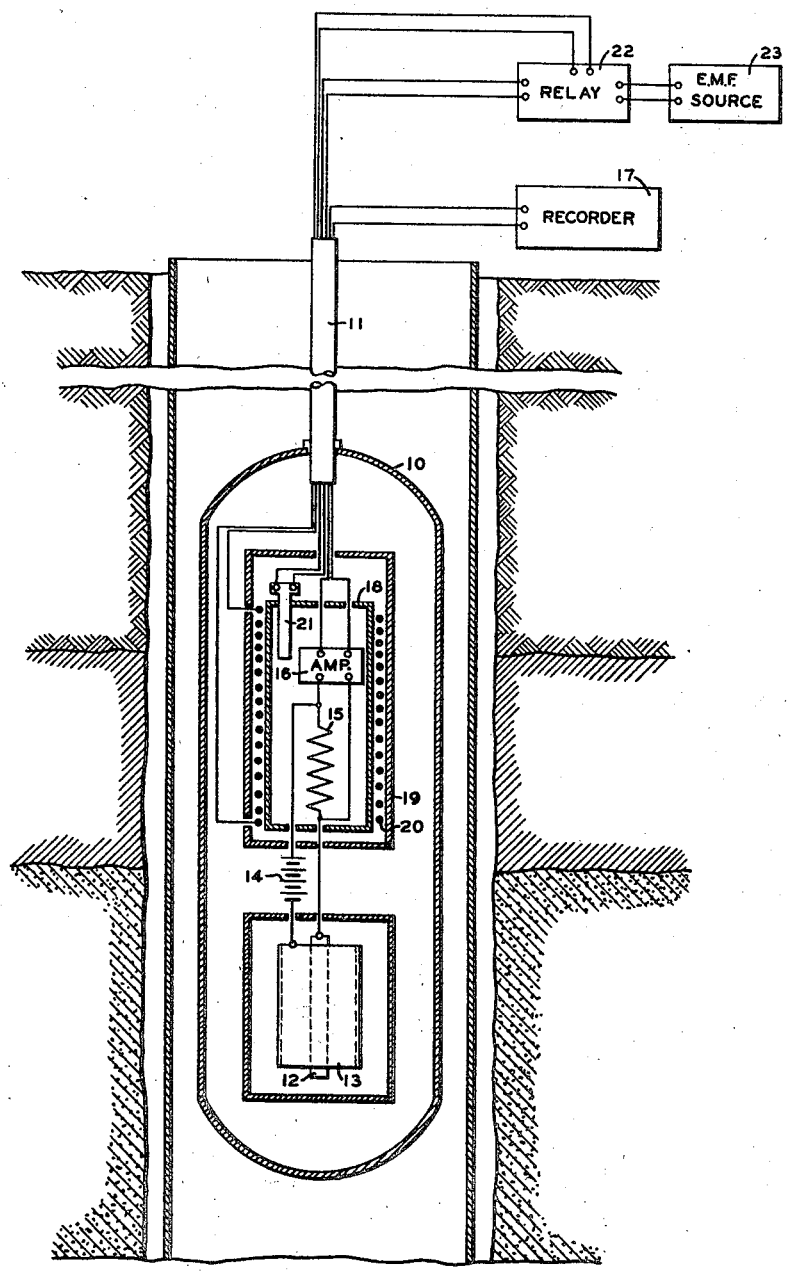

Dec. 30, 1947.    G. HERZOG    2,433,554
WELL LOGGING APPARATUS
Filed Oct. 27, 1942    3 Sheets-Sheet 1

GERHARD HERZOG
INVENTOR

BY R. J. Dearborn
HIS ATTORNEY

Dec. 30, 1947.　　　　G. HERZOG　　　　2,433,554
WELL LOGGING APPARATUS
Filed Oct. 27, 1942　　　　3 Sheets—Sheet 3

GERHARD HERZOG
INVENTOR

BY
HIS ATTORNEY

Patented Dec. 30, 1947

2,433,554

UNITED STATES PATENT OFFICE 2,433,554

WELL LOGGING APPARATUS

Gerhard Herzog, Houston, Tex., assignor to The Texas Company, New York, N. Y., a corporation of Delaware Application October 27, 1942, Serial No. 463,465

1 Claim. (Cl. 250—83.6)

This invention relates to an improvement in the apparatus and methods adapted for the determination of physical properties of the sub-surface in and around a bore hole, and particularly to such methods and apparatus as are used in the exploration of sub-surface formations adjacent a bore hole.

In the location and production of natural resources located at a considerable distance beneath the earth's surface, and particularly such raw materials as petroleum oil, gases, sulfur, salt, etc., which can only be reached by drilling operations and which are produced through a bore hole, it is essential for economical operation to know as much as can be ascertained concerning the physical properties of the sub-surface formations around the source of the material. These physical properties are determined through the use of various types of sensitive instruments and measuring devices which are lowered into the drill hole at various stages of the drilling operation and from which either isolated or continuous measurements are obtained.

As the depth of the drilling operation increases or penetrates formations of varying geological structure, the difficulties of accurately locating and measuring the particular physical properties become more pronounced. These difficulties have been recognized as being aggravated by the temperatures encountered at the depths from which the measurements are to be taken. The temperature in a bore hole increases with the depth in accordance with a particular temperature gradient which varies with the location of the well. As a general rule, the bottom-hole temperatures at the operating depths range between 100 and 150° F., and it is for operation up to these maximum temperatures that the majority of the instruments and measuring devices are designed. In recent operations, however, some bottom-hole temperatures have been found which are considerably in excess of this normal range and which go as high as 270° F. These abnormal temperature ranges have seriously limited the means and methods of determining the physical properties of the sub-surface by their detrimental effect on the characteristics of the temperature-sensitive portions of the instruments and measuring devices.

It is the purpose of the present invention to avoid the effect of increasing temperatures, and particularly abnormal temperatures, in a bore hole upon the temperature-sensitive portions of such instruments and measuring devices as are used in the determination of the physical properties of the sub-surface formations. In the usual practice of logging a well, or in the taking of isolated measurements along a bore hole the instrument to be used is standardized at the surface before introduction into the hole. After the desired measurements have been taken in the hole the instrument is returned to the surface and again standardized. The deviation from the original standard is then applied as a correction factor to the record of the measurements obtained. This method of applying corrections has definite limitations and can only be applied where the deviation from the standard is of a small magnitude and where there are no permanent changes in the characteristics of the instrument which would not permit standardization to the original standard. These limiting factors are dependent upon the temperatures to which the instrument is subjected while in the bore hole and their effect upon the temperature-sensitive portions of the instrument.

It has been found possible to eliminate the effect of increasing temperatures upon the temperature-sensitive portions of such instruments and measuring devices as are used in the determination of physical properties of the sub-surface adjacent a bore hole by maintaining the instrument or the temperature-sensitive portion thereof at a constant temperature while in operation.

In accordance with the present invention, the method of determining the physical properties of the sub-surface would comprise the steps of standardizing the instrument at a desired temperature, maintaining that temperature on the instrument or the temperature-sensitive portion thereof constant, and conducting measurements in a bore hole while maintaining the temperature constant. In this manner the instrument is maintained at standard conditions while traversing the bore hole, and the measurements obtained from the instrument are an accurate indication of the location and magnitude of the physical properties.

The constant temperature at which the instruments, or the temperature-sensitive portions thereof, is maintained depends upon the critical temperature range of the instrument and the use and conditions to which the instrument is subjected. The temperature selected should be the one at which optimum accuracy in measuring and efficiency in operation are obtained. These temperatures fall into three categories when considered with respect to the means for maintaining such temperatures constant. The first is that temperature which is equal to or less than the atmospheric temperature at the surface of the bore hole, which would require a controlled cooling means in or around the instrument. The second is that temperature which lies within the temperature range of the bore hole, which would require both a controlled heating and cooling means, and the third is that temperature which is equal to or greater than the maximum temperatures of the hole which would require a controlled heating element to maintain it constant.

It has been found preferable to operate in the third category of temperatures wherever possible, since the means required for maintaining a temperature equal to or greater than the maximum temperature of the bore hole are more economical in operation and easier to adapt to the conditions within the hole. The types of instruments to which this may be applied are those in which the sensitive-temperature portions are not affected by isolated temperatures found in a bore hole, but rather by the change from atmospheric to the maximum temperature of the hole. This is particularly true of many of the instruments or measuring devices employing electrical circuits which detect and measure the desired physical properties by means of an indirect current flow or a change in voltage. On the other hand, there are some instruments and measuring devices which are particularly sensitive to high temperatures and to which the preferred embodiment of the invention is not applicable. In such cases, the first or second category of temperature controls will have to be used. A notable example of such instruments would be those instruments which require the use of a photographic film to record the measurements within the bore hole. These films are sensitive to high temperatures which cause fogging and result either in a distorted or indistinct record or even in the destruction of the photographic emulsion.

As previously stated, the various categories of temperatures selected would involve the use of different means for maintaining this temperature constant. All the means employed in the present invention are those which are known to the art and have been accepted as constant temperature regulators.

In the first category of temperatures which would require a controlled cooling of the instrument, the means involved would take the form of such well-known methods and apparatus as controlled liquid expansion with liquids such as carbon dioxide, sulfur dioxide or ammonia, chemical absorption processes and double seal vacuum packing, etc. The third category of temperatures would require an ordinary thermostatically controlled heating element, and the second category, which might necessitate both cooling and heating, would involve a combination of the means employed in the first and third categories of temperatures.

It is to be understood that whenever the term "constant temperature" is used or referred to by implication in the specification and claim, this term includes such consistency of temperature as may be obtained by the use of the normally accepted constant temperature control methods.

As an example of the specific type of instrument to which the present invention is applicable, may be mentioned the radioactive well-logging instruments which employ an ionization chamber as the detector. This instrument is used for the determination of the natural radioactivity, of induced radioactivities and of ray-scattering properties of the sub-surface formations adjacent the bore hole for the purpose of determining the position and relationship of the geological strata surrounding the hole.

Figure 2:
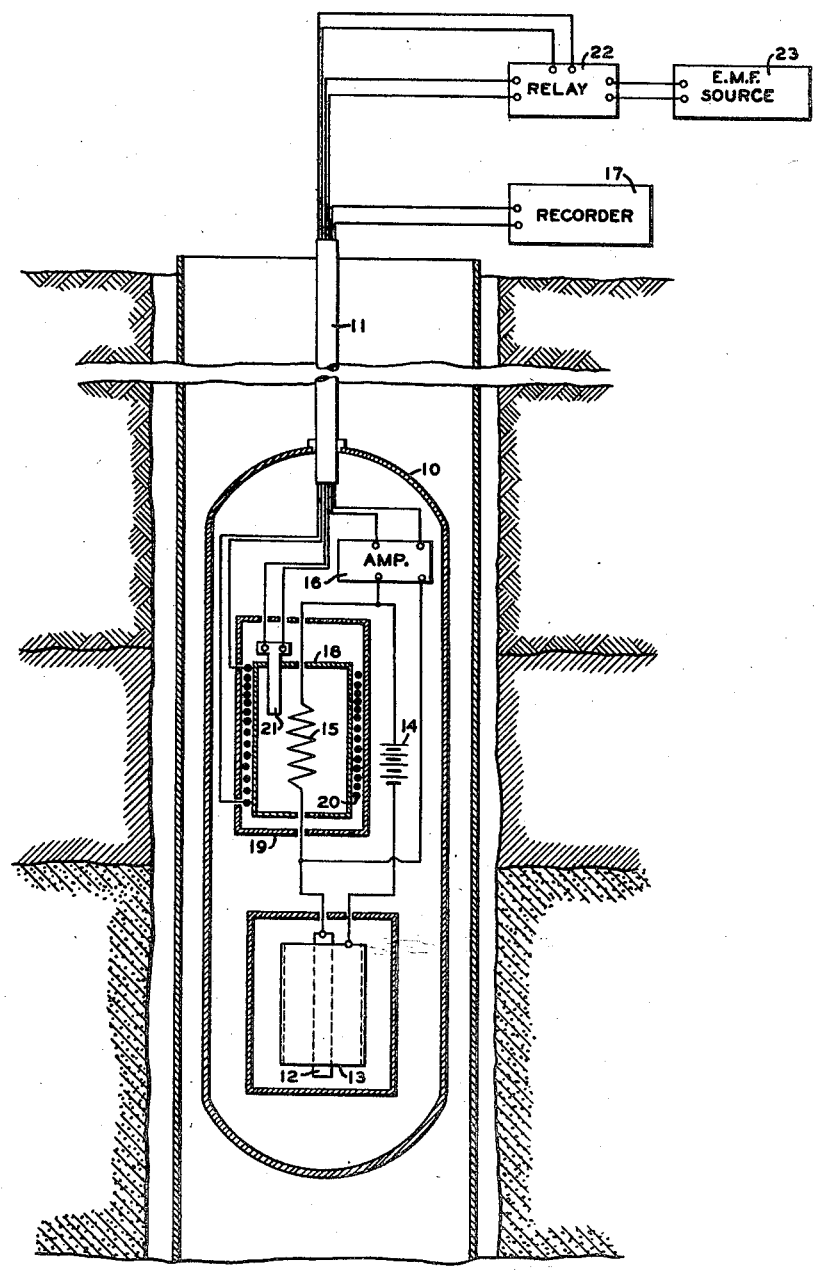
Figure 3:
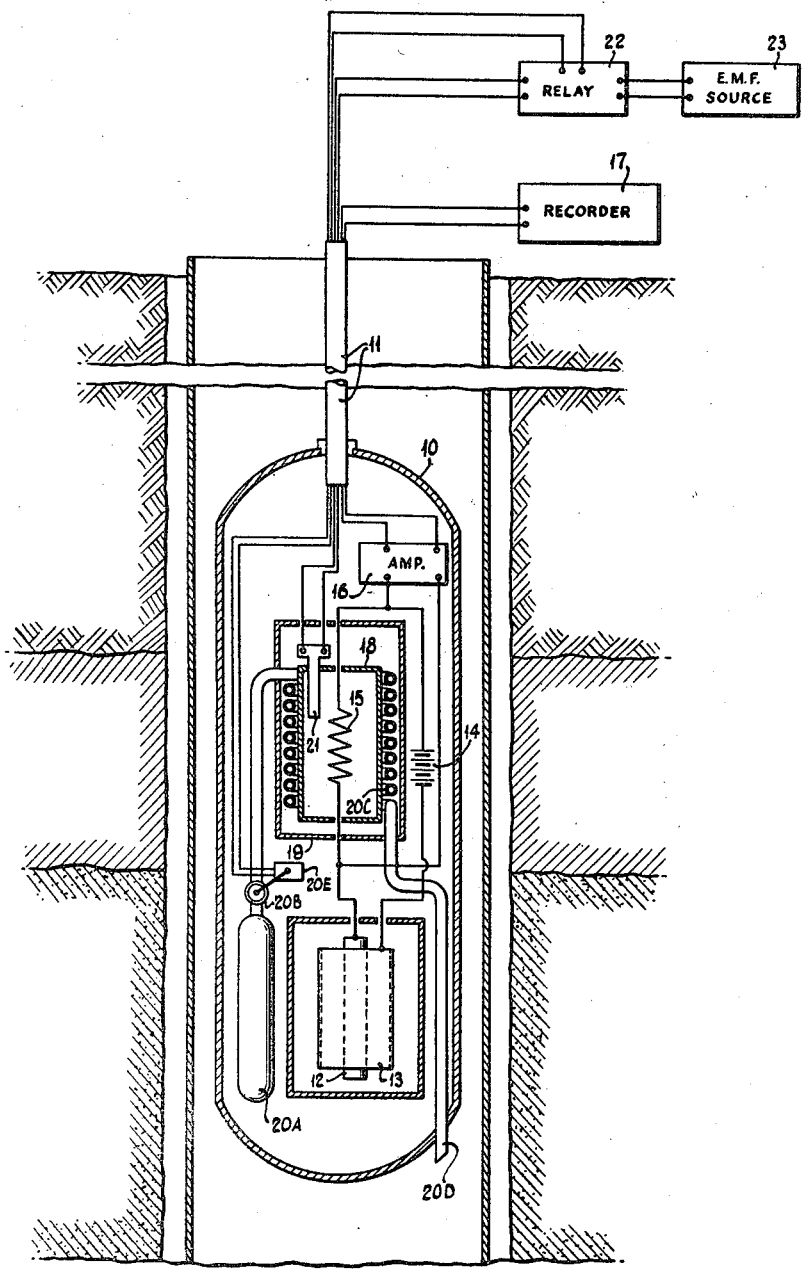

The attached drawings and the following description illustrate the means and methods for applying the constant temperature controls upon the temperature-sensitive portions of such an instrument and their relationship to the improvements in accuracy of the instrument. In the drawings Fig. 1 represents a schematic diagram of an ionization chamber circuit wherein the whole circuit is maintained at a constant temperature; Fig. 2 illustrates schematically the same instrument wherein the temperature-sensitive resistor is maintained at a constant temperature, and Figure 3 is a view similar to Figure 2 but illustrating an instrument wherein the temperature is maintained below that of the well formations.

As shown in the drawings, the instrument consists of a hermetically-sealed cylindrical casing 10 which is designed to house the necessary measuring apparatus. This casing is suspended in the bore hole by mean of a cable 11 which serves to convey both the measuring currents to the surface of the earth and the electrical currents necessary to actuate the constant temperature control the instrument. Within the cylindrical casing is an ionization chamber which consists of a rod-shaped electrode 12 surrounded by a second electrode 13 in the form of a closed cylinder. The enclosed space between the electrodes is filled with an inert gas which is maintained under a high pressure, usually around 300 to 1500 pounds per square inch. The electrodes of the chamber are connected in series to a source of potential, which is shown as a battery 14, and a relatively high resistor 15.

For convenience of illustration, the source of potential is shown as a battery 14. Obviously an electronic circuit providing a constant voltage supply can be used instead of the battery and may be more practical in some instances. This circuit, namely, the resistor 15, battery 14 and ionization chamber, is the fundamental circuit of the system from which a measure of the natural radioactivity of the surrounding geological formations is obtained. The battery 14 carries a potential of around 150 volts and the resistor 15 a resistance of around $10^{12}$ ohms. The potential drop across the resistor is amplified by means of an amplifier 16 connected across the resistor and the resulting amplified current is transmitted through the cable to the surface and from there to the recording apparatus 17.

The function of the ionization chamber circuit is to detect and measure the presence and intensity of penetrating radiations which are present in the bore hole. These radiations (e. g., gamma rays, neutrons, etc.) result from the decomposition of radioactive bodies present in the formations adjacent the hole and their intensity is an indication of the amount of radioactive material naturally present in these formations. Since the concentration of radioactive bodies varies with the changes in stratigraphy and the radium content of representative types of formations are known, a measure of the intensity of the penetrating radiations adjacent the instrument as it traverses the well-bore, is an indication of the position and structure of the sub-surface strata along the bore hole.

The radiations impinging upon the ionization chamber cause ionization of the gas which results in an increase in current flow in the circuit. These minute currents caused by the ionization of the gas, are of the order of $10^{-11}$ to $10^{-13}$ amperes and are proportional to the intensity of the impinging radiations. The magnitude of these currents is determined by the voltage drop across the resistor 15 which is then amplified and recorded.

The resistors necessary for the measurement of these minute currents are not very reliable under conditions of high temperature. It has been found that temperatures in excess of 150 to 170° F. effect a change in resistance which, in some instances, causes a permanent change in the characteristics of the resistor. These changes become apparent in the calibration of the resistor when brought back to atmospheric temperature and do not allow the instrument to be returned to its original standard. The resulting inaccuracies in measurement may be eliminated by the use of a constant temperature control upon the instrument, or the temperature-sensitive portions thereof, in accordance with the present invention. The particular constant temperature controls diagrammatically shown in both Figs. 1 and 2 of the drawings, illustrate an example of a thermostatically controlled heating element applied, in the case of Fig. 1, to the entire measuring circuit, and in the case of Fig. 2 to the temperature-sensitive resistor. In both of the figures the constant temperature apparatus consists of a heating jacket composed of a thermal-conductive casing 18 and a thermal-insulating casing 19, between which a heating element 20 is disposed. Within the chamber formed by the casing 18 that portion of the instrument which is to be maintained at a constant temperature is placed. The heating element 20, which is shown in the form of a coil of resistance wire is connected to a suitable source of potential 23 on the surface. The current supplied to the heating element is regulated by a suitable thermo-regulator 21 through a relay 22. This thermo-regulator 21 may consist of a pair of electrical contacts operated by a bimetallic thermostat strip which is set at the particular temperature desired. In the case of the ionization chamber circuit shown this temperature is preferably around 300° F.

The ionization chamber and the batteries 14, of course, can be contained within the temperature controlled chamber if desired.

As stated hereinabove, it may be desired to maintain a temperature within the instrument, or a portion of the instrument, which is lower than the well temperature. As an example, an instrument is shown in Figure 3 which includes a cooling system rather than a heating system. A pressure container 20A for a suitable gas, such as carbon dioxide, is connected through a regulating valve 20B to a heat exchanger coil 20C and then to an exhaust tube 20D. The remaining parts of the instrument shown in Figure 3 are substantially the same and bear the same reference characters as those in Figure 2. By opening the valve 20B, carbon dioxide gas is admitted to the heat exchanger coil 20C and during expansion the gas is cooled and thereby cools the heat exchanger and the chamber within the casing 18. The gas escapes through the tube 20D into the well. If desired, the valve 20B can be adjusted just before the instrument is lowered into the well so as to provide a predetermined cooling effect. Provision also can be made whereby the opening or closing of the valve 20B is automatically controlled by the thermo regulator 21 in a manner similar to that shown in Figure 2. Thus, the thermo regulator 21 will control the relay 22 to allow current from the source 23 to pass to any suitable solenoid or other actuating device 20E connected so as to actuate the valve 20B. It is understood that the cooling system shown in Figure 3 is by way of example only and that many other systems can be effectviely used.

It may be seen from the foregoing description that the effect of change in temperature within the bore hole upon sensitive instruments and measuring devices may be avoided by providing a method and apparatus for maintaining a constant temperature upon that portion of the instrument which is sensitive to temperature change.

Obviously many modifications and variations of the invention, as hereinbefore set forth, may be made without departing from the spirit and scope thereof, and therefore only such limitations should be imposed as are indicated in the appended claim.

I claim:

In a well logging apparatus in which an ionization chamber for measuring penetrative radiation is passed through a well, said ionization chamber being capable of generating an electrical current of approximately $10^{-11}$ to $10^{-13}$ amperes proportional to the intensity of said radiation, a resistor of the order of $10^{12}$ ohms connected in the output circuit of said ionization chamber, an instrument for measuring the voltage drop across said resistor and temperature controlling means for maintaining said resistor at a predetermined temperature during the passage of the instrument through the hole.

GERHARD HERZOG.

REFERENCES CITED

The following references are of record in the file of this patent:

UNITED STATES PATENTS

| Number | Name | Date |
|---|---|---|
| 2,160,823 | Black | June 6, 1939 |
| 2,219,273 | Sherbatskoy | Oct. 22, 1940 |
| 2,167,630 | Bazzoni | Aug. 1, 1939 |
| 2,273,215 | Neufeld | Feb. 17, 1942 |

FOREIGN PATENTS

| Number | Country | Date |
|---|---|---|
| 516,602 | Great Britain | Jan. 5, 1940 |